United States Patent [19]

Inui

[11] Patent Number: 4,842,112
[45] Date of Patent: Jun. 27, 1989

[54] GEAR SYNCHRONIZER FOR POWER TRANSMISSION

[75] Inventor: Masaki Inui, Toyota, Japan

[73] Assignee: Toyota Jidosha Kabushiki Kaisha, Aichi, Japan

[21] Appl. No.: 191,962

[22] Filed: May 9, 1988

[30] Foreign Application Priority Data

May 9, 1987 [JP] Japan ............... 62-113101

[51] Int. Cl.$^4$ .................. F16D 11/06; F16D 23/04
[52] U.S. Cl. .................. 192/53 F; 74/339; 192/53 C
[58] Field of Search ............... 192/53 F, 53 C, 53 R, 192/54

[56] References Cited

U.S. PATENT DOCUMENTS

| | | | |
|---|---|---|---|
| 2,993,579 | 3/1959 | Altmann | 192/114 |
| 3,175,412 | 3/1965 | Peras | 74/339 |
| 3,414,098 | 12/1968 | Kelbel | 192/53 |
| 3,934,689 | 1/1976 | Kunz | 192/53 C |
| 4,299,317 | 11/1981 | Katayama | 192/53 F |
| 4,413,715 | 11/1983 | Michael et al. | 192/53 F |
| 4,573,371 | 3/1986 | Akutagawa | 74/339 |
| 4,625,844 | 12/1986 | Ikemoto et al. | 192/53 F |
| 4,732,247 | 3/1988 | Frost | 192/53 F |
| 4,736,643 | 4/1988 | Richards | 192/53 F |
| 4,750,597 | 6/1988 | Ikemoto et al. | 192/53 F |

FOREIGN PATENT DOCUMENTS

| | | | |
|---|---|---|---|
| 145388 | 6/1985 | European Pat. Off. | |
| 1127229 | 4/1962 | Fed. Rep. of Germany . | |
| 2118126 | 11/1971 | Fed. Rep. of Germany | 192/53 F |
| 2331053 | 1/1975 | Fed. Rep. of Germany . | |
| 2808897 | 9/1979 | Fed. Rep. of Germany . | |
| 225867 | 8/1985 | Fed. Rep. of Germany . | |
| 870198 | 3/1942 | France . | |
| 680079 | 4/1966 | France . | |
| 2556437 | 6/1985 | France . | |
| 51-48540 | 12/1976 | Japan . | |
| 1137332 | 12/1968 | United Kingdom . | |
| 2048399 | 12/1980 | United Kingdom . | |

*Primary Examiner*—James T. McCall
*Attorney, Agent, or Firm*—Oliff & Berridge

[57] ABSTRACT

In a gear synchronizer, a clutch sleeve has internal splines in continual engagement with external splines of a hub member fixed to a shaft and is axially shiftable to be engaged at its internal splines with external splines of a spline piece integral with a gear member rotatable on the shaft. The gear synchronizer includes a support ring encircling the spline piece and having a radial projection axially movable in a corresponding radial recess in the spline piece, a first synchronizer ring coupled with the support ring and having an external frustoconical surface for frictional engagement with an internal frustoconical surface formed on one side of the clutch sleeve, a second synchronizer ring axially movably coupled with the first synchronizer ring for relative rotation and coupled with the support ring for rotation therewith and having an internal frustoconical surface for frictional engagement with an external frustoconical surface formed on the one side of the clutch sleeve, and an annular waved spring disposed between the synchronizer rings. When shifting, the second synchronizer ring is brought into frictional engagement with the external frustoconical surface of the clutch sleeve against the waved spring after frictional engagement of the first synchronizer ring with the internal frustoconical surface of the clutch sleeve.

8 Claims, 6 Drawing Sheets

GEAR SYNCHRONIZER FOR POWER TRANSMISSION

BACKGROUND OF THE INVENTION

1. Field of the Invention

The present invention relates to a gear synchronizer for power transmissions, and more particularly, but not exclusively, to a gear synchronizer of the type which comprises a gear member rotatable on a transmission shaft, a spline piece formed thereon with external splines and provided on a hub portion of the gear member for rotation therewith, a hub member formed thereon with external splines and mounted on the transmission shaft for rotation therewith, a clutch sleeve encircling the hub member and having an internal frustoconical portion formed at one side thereof and internal splines in continual engagement with the external splines of the hub member, the clutch sleeve being axially shiftable toward and away from the gear member to be engaged at the internal splines thereof with the external splines of the spline piece, and a synchronizer ring encircling the spline piece and having a radial projection axially movable in a corresponding recess formed in the spline piece and an external frustoconical surface for frictional engagement with the frustoconical portion of the clutch sleeve, the synchronizer ring being loaded radially outwardly by means of a spring to be retained in a neutral position where it is disengaged from the frustoconical portion of the clutch sleeve.

2. Description of the Prior Art

In Japanese Patent Publication No. 51-48540, there has been proposed such a gear synchronizer as described above, wherein the external frustoconical surface of the synchronizer ring can be formed larger in diameter than an internal frustoconical surface of a synchronizer ring in a conventional synchronizer of the Borg-Warner type. In operation of the gear synchronizer, the synchronizer ring acts to effect relatively large synchronous action or capacity in comparison with the synchronizer of the Borg-Warner type. In the case that the gear synchronizer is designed to obtain the same synchronous capacity as that of the Borg-Warner type synchronizer, and the synchronizer ring can be constructed small in size to reduce an axial displacement amount of the clutch sleeve when shifting in order to minimize the shift stroke of a manual shift lever. In the case that the shift stroke of the manual shift lever is determined in the same amount as that in the Borg-Warner type synchronizer, the lever ratio of the manual shift lever can be increased to reduce the operator's effort applied to the shift lever for shifting the clutch sleeve.

SUMMARY OF THE INVENTION

A primary object of the present invention is to provide an improved gear synchronizer capable of further increasing the synchronous capacity of the synchronizer described above.

According to the present invention, the object is attained by providing a gear synchronizer which includes a gear member rotatable on a transmission shaft, a spline piece formed thereon with external splines and provided on a hub portion of the gear member for rotation therewith, a hub member formed with external splines and mounted on the transmission shaft for rotation therewith, and a clutch sleeve encircling the hub member and having internal splines in continual engagement with the external splines of the hub member, the clutch sleeve being axially shiftable toward and away from the gear member to be engaged at the internal splines thereof with the external splines of the spline piece, characterized in that the gear synchronizer comprises a support ring encircling the spline piece and having a radial projection formed at an inner periphery thereof and disposed axially movably in a corresponding radial recess formed in the spline piece, a first synchronizer ring coupled with the support ring and having an external frustoconical surface for frictional engagement with an internal frustoconical surface formed on one side of the clutch sleeve, a second synchonizer ring disposed between the support ring and the first synchronizer ring and being axially movably coupled with the first synchronizer ring for relative rotation and axially movably coupled with the support ring for rotation therewith, the second synchronizer ring having an internal frustoconical surface for frictional engagement with an external frustoconical surface formed on the one side of the clutch sleeve, resilient means disposed between the first and second synchronizer rings to bias the first synchronizer ring for engagement with the support ring and to bias the second synchronizer ring for engagement with the first synchronizer ring, cam means arranged to effect relative axial displacement of the synchronizer rings against the biasing force of the resilient means in response to relative rotation between the synchronizer rings, and support means disposed in the radial recess of the spline piece to resiliently receive the radial projection of the support ring thereon.

BRIEF DESCRIPTION OF THE DRAWINGS

Other objects, features and advantages of the present invention will become more readily apparent from the following detailed description of a preferred embodiment thereof when considered with reference to the accompanying drawings, in which.

DESCRIPTION OF THE PREFERRED EMBODIMENT

Figure 1:
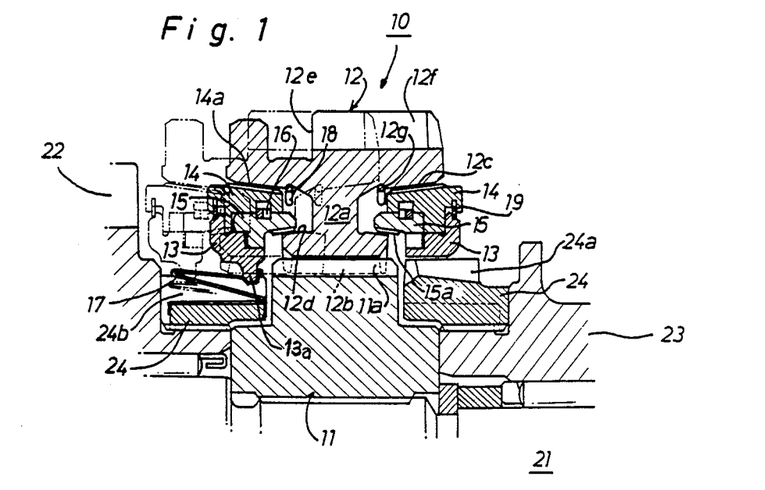
FIG. 1 illustrates in cross-sectional form one of the circumferentially equi-spaced parts of a gear synchronizer according to the present invention.

Referring now to the drawings, wherein like reference numerals represent the same or corresponding parts throughout the figures, there is illustrated, in FIG. 1, a transmission shaft 21 on which are rotatably supported a pair of axially spaced change-speed gears 22 and 23. Disposed between the change-speed gears 22 and 23 is a pair of synchronizer assemblies 10 which are operable to cause selective speed synchronization between the shaft 21 and the gears 22 and 23, respectively. The synchronizer assemblies have a common hub assembly which includes a hub member 11 fixed to the transmission shaft 21 by means of a spline connection to rotate therewith. The synchronizer assemblies are arranged to be operated through a clutch sleeve 12 which is connected by a yoke groove 12e to a conventional manual shift mechanism (not shown). The hub member 11 is formed thereon with external splines 11a. The clutch sleeve 12 is arranged in surrounding relationship with the hub member 11 and has an annular body portion 12a which is formed with internal splines 12b in continual engagement with the external splines 11a of hub member 11. The clutch sleeve 12 is axially shiftable to be engaged at its internal splines 12b with external splines 24a of a spline piece 24. The spline piece 24 is fixedly mounted on each hub portion of change-speed gears 22 and 23 for rotation therewith.

In this embodiment, the clutch sleeve 12 has an outer cylindrical flange formed at its inner periphery with a pair of first internal frustoconical surfaces 12c and an inner cylindrical flange formed thereon with a pair of second external frustoconical surfaces 12d. The outer cylindrical flange of clutch sleeve 12 is further formed thereon with a reverse gear 12f. The right-hand synchronizer assembly is substantially the same as the left-hand synchronizer assembly such that a detailed description of the left-hand synchronizer assembly only is believed necessary. The left-hand synchronizer assembly includes a support ring 13 arranged in surrounding relationship with the spline piece 24, a first synchronizer ring 14 coupled with the support ring 13, a second synchronizer ring 15 coupled with the first synchronizer ring 14, an annular waved spring 16 disposed between the synchronizer rings 14 and 15, a plurality of circumferentially equally spaced support springs 17 contained within corresponding radial recesses 24b formed in the spline piece 24, and a ring-shaped thrust spring 18 retained in place by engagement with an inner periphery of the outer cylindrical flange of clutch sleeve 12.

Figure 2:
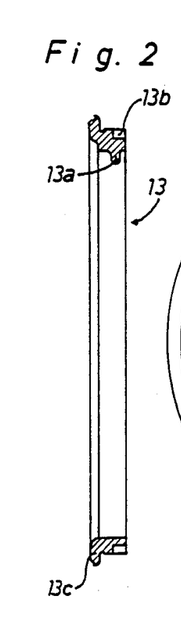
FIG. 2 is a cross-sectional view of a support ring shown in FIG. 1.
Figure 3:
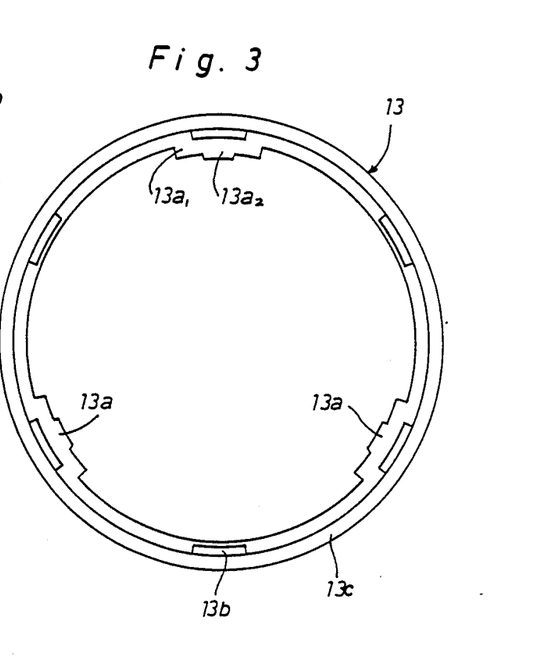
FIG. 3 is a front view of the support ring shown in FIG. 2.
Figure 4:
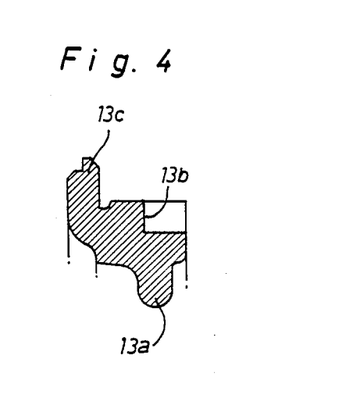
FIG. 4 is an enlarged cross-sectional view of a portion of the support ring shown in FIG. 2.
Figures 5, 6:
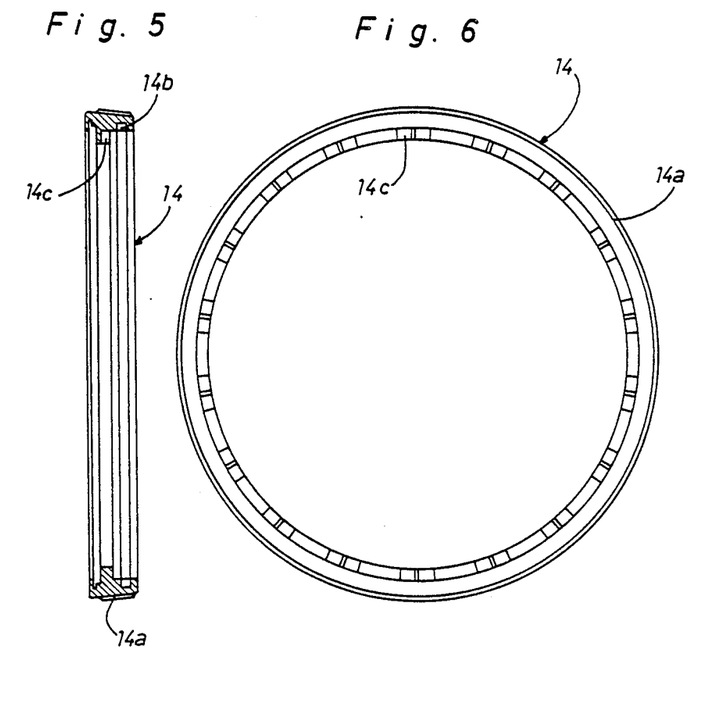
FIG. 5 is a cross-sectional view of a first synchronizer ring shown in FIG. 1.
FIG. 6 is a front view of the first synchronizer ring shown in FIG. 5.
Figure 7:
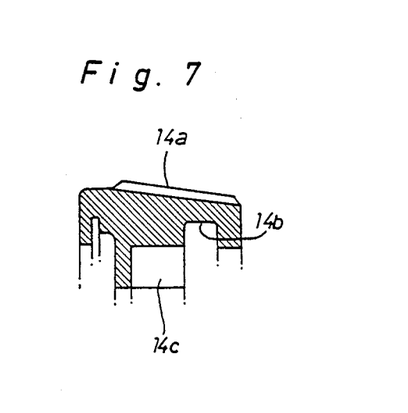
FIG. 7 is an enlarged cross-sectional view of a portion of the first synchronizer ring shown in FIG. 5.
Figure 8:
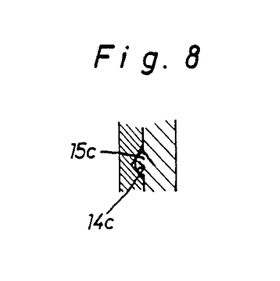
FIG. 8 is a sectional view illustrating a cam mechanism of the first synchronizer ring.
Figure 9:
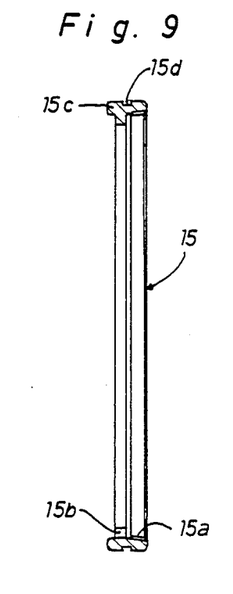
FIG. 9 is a cross-sectional view of a second synchronizer ring coupled with the first synchronizer ring shown in FIGS. 5-7.
Figure 10:
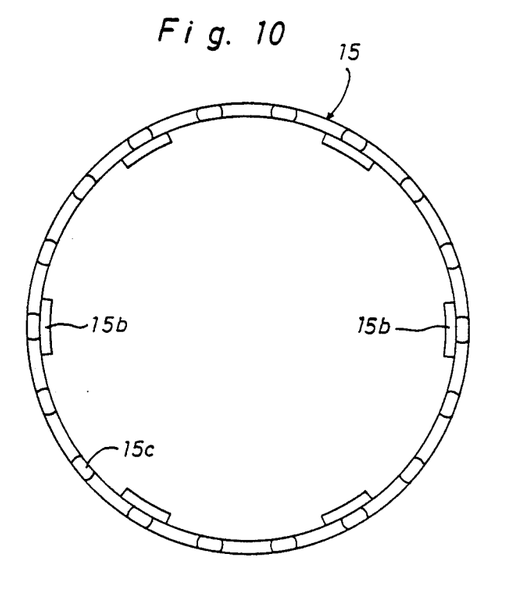
FIG. 10 is a rear view of the second synchronizer ring shown in FIG. 9.
Figure 11:
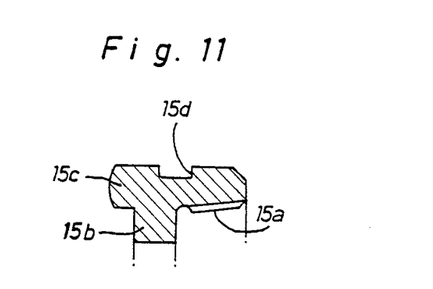
FIG. 11 is an enlarged cross-sectional view of a portion of the second synchronizer ring shown in FIG. 9.

As shown in FIGS. 2 to 4, the support ring 13 is integrally formed at its inner periphery with three circumferentially equally spaced radial projections 13a and at its outer periphery with six circumferentially equally spaced radial recesses 13b and an annular projection 13c. The radial projections 13a are each formed with first and second engagement portions $13a_1$ and $13a_2$. The radial recesses 13b each open radially outwardly. As shown in FIGS. 5 to 7, the first synchronizer ring 14 is formed thereon with an external frustoconical surface 14a i and at its inner periphery with an annular groove 14b and a plurality of circumferentially equally spaced cam grooves 14c. As shown in FIG. 8, the cam grooves 14c each are in the form of a V-groove having a pair of inclinded cam surfaces. As shown in FIGS. 9 to 11, the second synchronizer ring 15 is formed at its inner periphery with an internal frustoconical surface 15a and six circumferentially equally spaced radial projections 15b and its outer periphery with an annular groove 15d. The second synchronizer ring 15 is formed at its one side with a plurality of circumferentially equally spaced cam projections 15c.

In a condition where the second synchronizer ring 15 has been coupled with the first synchronizer ring 14 as shown in FIG. 1, the cam projections 15c of the former ring 15 are engaged with the cam grooves 14c of the latter ring 14. Disposed within an annular space between the grooves 14b and 15d of respective rings 14 and 15 is the annular waved spring 16 which acts to position the synchronizer rings 14 and 15 in an axial direction. As shown in FIG. 8, the cam projections 15c of ring 15 are each formed with a semicircular cam surface which is in contact with the inclined cam surfaces of the corresponding cam groove 14c under the load of waved spring 16. When relative rotation of the synchronizer rings 14 and 15 is caused by shifting of the clutch sleeve 12, the cam projections 15c of ring 15 cooperate with the cam grooves 14c of ring 14 to effect relative displacement of rings 14 and 15 in an axial direction against the biasing force of waved spring 16.

When the synchronizer rings 14 and 15 have been coupled with the support ring 13 after being coupled with each other, the inner circumference of synchronizer ring 14 is engaged with the annular projection 13c of support ring 13, and the radial projections 15b of synchronizer ring 15 are engaged with the radial recesses 13b of support ring 13 as shown in FIG. 1. In such a condition, the first synchronizer ring 14 is fixed to the support ring 13 by means of a snap ring 19 coupled thereto, while the second synchronizer ring 15 is positioned to be axially movable against the biasing force of waved spring 16. When the support ring 13 has been arranged in surrounding relationship with the spline piece 24 as shown in FIG. 1, the external frustoconical surface 14a of synchronizer ring 14 is arranged to be frictionally engaged with the first internal frustoconical surface 12c of clutch sleeve 12, while the internal frustoconical surface 15a of synchronizer ring 15 is arranged to be frictionally engaged with the second external frustoconical surface 12d of clutch sleeve 12.

Figure 12:
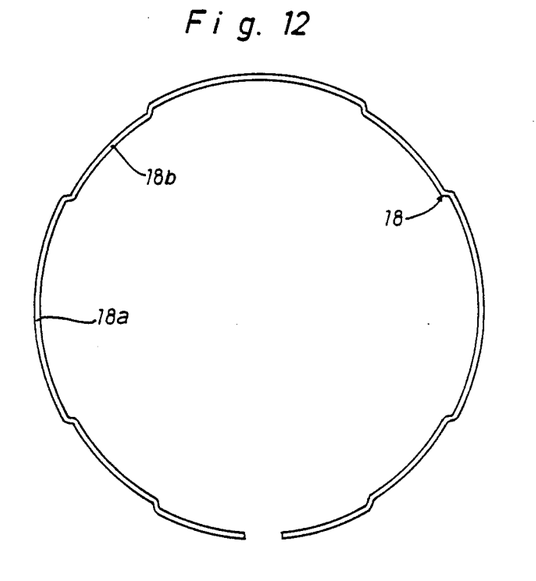
FIG. 12 is a front view of a ring-shaped thrust spring shown in FIG. 1.
Figure 13:
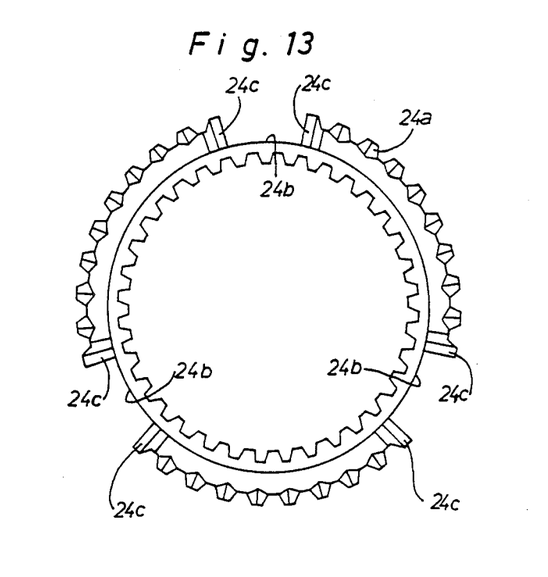
FIG. 13 is a front view of a spline piece shown in FIG. 1.
Figure 14:
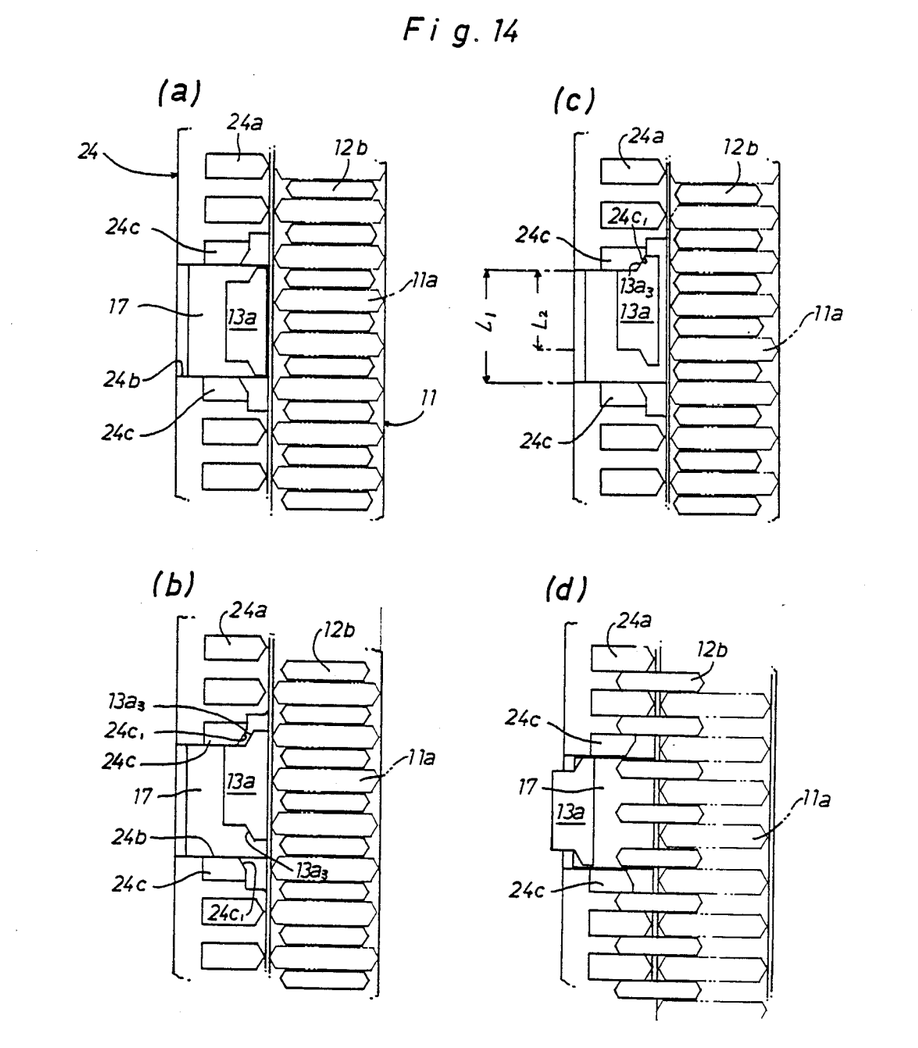
FIG. 14 illustrates the mode of shifting operation of the gear synchronizer assembly, showing the relative positions of the components thereof.

As shown in FIG. 12, the ring-shaped thrust spring 18 has large and small diameter portions 18a and 18b alternately formed thereon. In a condition where the thrust spring 18 has been retained in place by engagement with an annular stepped portion 12g of clutch sleeve 12 as shown in FIG. 1, the small diameter portions 18b of spring 18 are arranged to be engaged with an inner end of synchronizer ring 14. As shown in FIGS. 13 and 14, the spline piece 24 has three sets of circumferentially spaced external splines 24a engageable with the internal splines 12b of clutch sleeve 12. The radial recesses 24b are each formed between the external splines 24a and defined by a pair of external end splines 24c to contain the support springs 17 therein.

Figure 15:
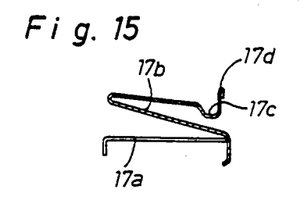
FIG. 15 is a sectional side view of a support spring coupled within a corresponding radial recess formed in the spline piece as shown in FIG. 1.
Figure 16:
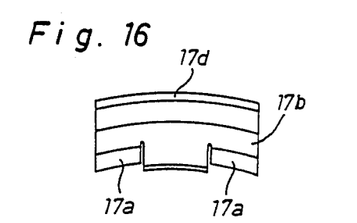
FIG. 16 is a front view of the support spring shown in FIG. 15.
Figure 17:
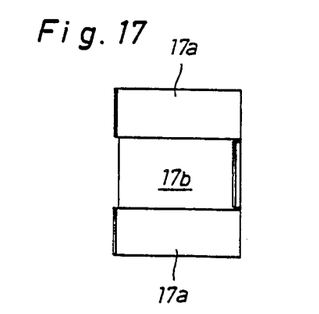
FIG. 17 is a bottom view of the support spring shown in FIG. 15.

As shown in FIGS. 15 to 17, the support springs 17 are each integrally formed with a pair of legs 17a, a leaf spring part 17b, a recessed part 17c and a head part 17d. Each of the support springs 17 is each retained in place at its legs 17a by engagement with the bottom part of the corresponding radial recess 24b in such a manner that the respective recessed parts 17c of support springs 17 are resiliently engaged with the radial projections 13a of support ring 13 and that the respective head parts 17d of support springs 17 extend radially outwardly from the inner circumference of internal splines 12b of clutch sleeve 12. Thus, the support springs 17 act to resiliently receive the support ring 13 thereon and to restrict axial displacement of the support ring 13. In such a condition, as shown in (a) of FIG. 14, the radial projections 13a of support ring 13 are each positioned between the pair of end splines 24c to be rotated relatively to the spline piece 24 in a predetermined extent ($L_1-L_2$). When the support ring 13 is rotated relatively to the spline piece 24 as shown in (b) of FIG. 14, a chamfer $13a_3$ of radial projection 13a is opposed to a corresponding chamfer $24c_1$ of end spline 24c.

When that the clutch sleeve 12 is shifted to the left by the operator to engage the change-speed gear 22 to the transmission shaft 21, the thrust spring 18 will move with the clutch sleeve 12 to abut against and urge the first synchronizer ring 14 to the left which will cause slight relative rotation between the support ring 13 and the spline piece 24. At this initial stage, as shown in (b) of FIG. 14, the radial projections 13a of support ring 13 are engaged with the end splines 24c of spline piece 24 and further engaged at their chamfers $13a_3$ with the chamfers $24c_1$ of end splines 24c as shown in (c) of FIG. 14. Subsequently, the first internal frustoconical surface 12c of clutch sleeve 12 is brought into frictional engagement with the external frustoconical surface 14a of synchronizer ring 14 to cause relative rotation between the synchronizer rings 14 and 15. As a result, the cam projections 15c of ring 15 cooperate with the cam grooves 14c of ring 14 to effect relative axial displacement of rings 14 and 15 against the biasing force of waved spring 16. This causes frictional engagement of the internal frustoconical surface 15a of synchronizer ring 15 with the second external frustoconical surface 12d of clutch sleeve 12. Under this condition, the operator's effort applied to clutch sleeve 12 is transmitted as a synchronous torque to the support ring 13 from the synchronizer ring 14 through second synchronizer ring 15 and is further transmitted as a synchronous torque directly to the support ring 13 from the second synchronizer ring 15.

When the thrust pressure acting on support ring 13 exceeds a predetermined value, synchronism between the relatively rotating parts is established, and the radial projections 13a of support ring 13 ride over the support springs 17 thereby compressing them radially inwardly, as shown in (d) of FIG. 14. Thus, the internal splines 12b of clutch sleeve 12 will be brought into engagement with the external splines 24a of spline piece 24 to accomplish the synchronization. Immediately after the synchronization has been accomplished, the waved spring 16 acts to disengage the second synchronizer ring 15 from the second frustoconical surface 12d of clutch sleeve 12. Under such a condition, the respective head parts 17d of support springs 17 are compressed radially inwardly by engagement with the internal splines 12b of clutch sleeve 12 to disengage the support springs 17 from the support ring 13 and to retain the clutch sleeve 12 in its shifted position. When the clutch sleeve 12 is returned rightwards to the neutral position, the support springs 17 are disengaged from the internal splines 12b of clutch sleeve 12 and engaged with the support ring 13 to thrust it toward the neutral position. Thus, the synchronizer rings 14 and 15 are smoothly returned to and retained in the neutral position under the biasing force of support springs 17.

While the invention is susceptible of various modifications and alternative constructions, a preferred embodiment is shown in the drawings and is herein described in detail. It is to be understood, however, that it is not thereby intended to limit the invention to the specific form disclosed. On the contrary it is intended to cover all modifications and alternative constructions falling within the spirit and scope of the invention as expressed in the appended claims.

What is claimed is:

1. A gear synchronizer comprising a gear member rotatable on a transmission shaft, a spline piece formed thereon with external splines and provided on a hub portion of said gear member for rotation therewith, a hub member formed thereon with external splines and mounted on said transmission shaft for rotation therewith, a clutch sleeve encircling said hub member and having internal splines in continual engagement with the external splines of said hub member, said clutch sleeve being axially shiftable toward and away from said gear member to be engaged at the internal splines thereof with the external splines of said spline piece, a support ring encircling said spline piece and having a radial projection formed at an inner periphery thereof and disposed axially movably in a corresponding radial recess formed in said spline piece;

a first synchronizer ring coupled with said support ring and having an external frustoconical surface for frictional engagement with an internal frustoconical surface formed on one side of said clutch sleeve;

a second synchronizer ring disposed between said support ring and said first synchronizer ring and being axially movably coupled with said first synchronizer ring for relative rotation and axially movably coupled with said support ring for rotation therewith, said second synchronizer ring having an internal frustoconical surface for frictional engagement with an external frustoconical surface formed on the one side of said clutch sleeve;

resilient means disposed between said first and second synchronizer rings to bias said first synchronizer ring for engagement with said support ring and to bias said second synchronizer ring for engagement with said first synchronizer ring;

cam means arranged to effect relative axial displacement of said synchronizer rings against the biasing force of said resilient means in response to relative rotation between said synchronizer rings; and support means disposed in the radial recess of said spline piece to resiliently receive the radial projection of said support ring thereon.

2. A gear synchronizer as claimed in claim 1, wherein said clutch sleeve has an outer cylindrical flange formed at an inner periphery thereof with the internal frustoconical surface for frictional engagement with the external frustoconical surface of said first synchronizer ring and an inner cylindrical flange formed on the external frustoconical surface for frictional engagement with the internal frustoconical surface of said second synchronizer ring.

3. A gear synchronizer as claimed in claim 1, wherein said support ring is formed at an outer periphery thereof with a plurality of circumferentially spaced radial recesses, and said second synchronizer ring is formed at an inner periphery thereof with a plurality of circumferentially spaced radial projections which are engaged with the radial recesses of said support ring in such a manner as to permit axial movement of said second synchronizer ring toward and away from said clutch sleeve.

4. A gear synchronizer as claimed in claim 1, wherein said first synchronizer ring is formed at an inner periphery thereof with an annular groove, and said second synchronizer ring is formed at an outer periphery thereof with an annular groove which corresponds with the annular groove of said first synchronizer ring to form an annular space therebetween, and wherein said resilient means is in the form of an annular waved spring disposed within the annular space between said first and second synchronizer rings.

5. A gear synchronizer ring as claimed in claim 1, further comprising a ring-shaped thrust spring retained in place by engagement with an annular stepped portion formed on the one side of said clutch sleeve, said thrust spring being formed to be engaged with an inner end of said first synchronizer ring during shifting of said clutch sleeve toward said first synchronizer ring.

6. A gear synchronizer as claimed in claim 1, wherein said cam means comprises a plurality of circumferentially spaced cam grooves formed in an inner periphery of said first synchronizer ring, and a plurality of circumferentially spaced cam projections formed on one side of said second synchronizer ring which are engaged with the cam grooves of said first synchronizer ring under the biasing force of said resilient means.

7. A gear synchronizer as claimed in claim 1, wherein said support means is in the form of a support spring contained within the radial recess of said spline piece to resiliently receive the radial projection of said support ring thereon.

8. A gear synchronizer as claimed in claim 7, wherein said support spring is integrally formed with a pair of legs, a leaf spring part, a recessed part and a head part, the legs of said support spring being retained in place by engagement with a bottom part of said radial recess of said spline piece in such a manner that the recessed part of said support spring is resiliently engaged with the radial projection of said support ring and that the head part of said support spring is positioned to be compressed radially inwardly by engagement with the inner circumference of the internal splines of said clutch sleeve during shifting of said clutch sleeve.

* * * * *